Sept. 16, 1958  E. J. LIMPEL  2,852,649
METHOD AND APPARATUS FOR PRESSURE WELDING
Filed Dec. 29, 1955
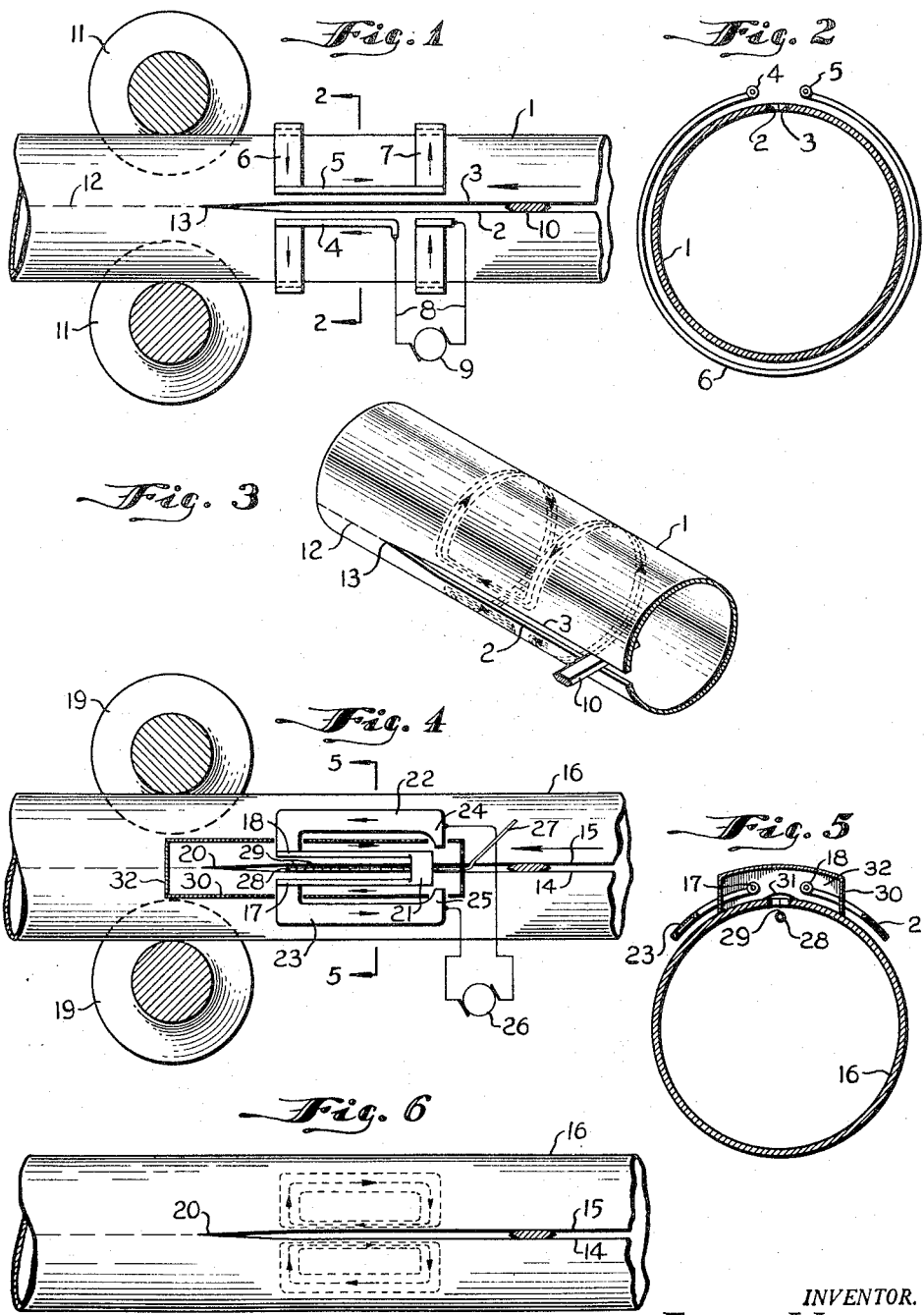
INVENTOR.
EUGENE J. LIMPEL
BY
Andrus & Sceales
Attorneys

United States Patent Office 2,852,649
Patented Sept. 16, 1958

2,852,649

METHOD AND APPARATUS FOR PRESSURE WELDING

Eugene J. Limpel, Thiensville, Wis., assignor to A. O. Smith Corporation, Milwaukee, Wis., a corporation of New York Application December 29, 1955, Serial No. 556,123

12 Claims. (Cl. 219—8.5)

This invention relates to a method and apparatus for pressure welding of metallic members and more particularly to the use of high frequency induced current to heat the members to welding temperature.

The invention is particularly adaptable for welding together adjacent edges of a metal article or articles, for example, the opposed longitudinal edges of a tubular blank.

The pressure welding together of adjacent edges of two metallic surfaces is accomplished, according to one method, by inducing a high frequency electric current in the metal edges which raises the latter to a welding temperature. A weld of the edges is then affected by forcing them together.

As disclosed in United States Patent No. 2,692,322, issued on October 19, 1954, it is important in induction welding that the induced currents do not flow across the point of contact of the metal edges being joined. If the induced current flows across the point of contact, or apex, of the edges being joined, a uniform high quality weld cannot be obtained.

The present invention employs the proximity effect of a high frequency current to concentrate the current along the edges and to eliminate current flow about the apex of adjacent metallic edges to be welded together.

As is well known in the art, a high frequency current tends to merge with an adjacent oppositely flowing current. This effect is known as the proximity effect of a high frequency current.

As related to electrical induction, an induced current flows in a direction diametrically opposite to that of the inducing current and therefore, it tends to follow a path immediately adjacent the latter. Assume, for purposes of example, that a generally M-shaped conductor is disposed in slightly spaced relation to a metallic plate and that the conductor is connected to a high frequency current source. Due to the flux set up by the applied current, an induced current flows in the metallic plate and due to the proximity effect, the induced current flow is in a generally M-shaped path lying immediately adjacent the M-shaped conductor.

In accordance with the present invention, a pair of current conductors are disposed in parallel relation, one to each of the adjacent edges to be welded together. The conductors are connected in circuit with a source of high frequency current to create opposed induced currents along the respective edges to be welded. The circuit or conductor connecting the parallel conductors to the high frequency current is disposed adjacent the metal articles to effect the induced current flow away from the apex in accordance with the proximity effect accompanying a high frequency current. This not only prevents the flow of induced current about the apex but also prevents arcing across the edges to be welded as the edges are converged.

The drawings furnished herewith illustrate the best mode presently contemplated for carrying out the invention.

In the drawings:

Figure 1 is a plan view of an apparatus for welding the longitudinal edges of a tubular blank by induction heating;

Fig. 2 is a view taken on line 2—2 of Figure 1;

Fig. 3 is a perspective view of the embodiment of Fig. 1 illustrating the general path of the induced currents;

Fig. 4 is a plan view of another embodiment of the invention with the upper part of the gas shield cover removed;

Fig. 5 is a view taken on line 5—5 of Fig. 4; and

Fig. 6 is a plan view showing the induced current flow arising from the structure shown in Fig. 4.

Referring to Figs. 1 and 2, there is illustrated a tubular blank 1 having longitudinal edges 2 and 3 spaced in opposed relation for welding into a finished pipe or tube. The edges 2 and 3 are heated by inducing a current flow therein and subsequently are welded together by forcing the edges together to provide a longitudinal butt seam weld.

In carrying out the invention, similar slender, rod-like inducing conductors 4 and 5 are disposed adjacent the edges 2 and 3 with each conductor in generally parallel alignment with one of the spaced longitudinal edges 2 and 3, as shown in Figure 1. The blank 1 is adapted to move relatively to the conductors 4 and 5, and as the conductors are made of a substantial length, a heating current is induced in the edges 2 and 3 for a substantial period of time prior to the welding of the edges together. The conductors 4 and 5 are in radially spaced relation to the pipe blank 1 to confine the heating to the action of the induced currents in the pipe blank 1.

The rod-like conductors 4 and 5 have one end, shown to the left in the drawing, connected by a current distributing strap conductor 6 which encircles the underside of the pipe blank 1. The rod-like conductor 4 has its opposite end, shown to the right in the drawing, connected to a strap conductor 7 which encircles the underside of the pipe blank 1 and terminates adjacent to and in spaced relation to the inducing conductor 5.

To apply a high frequency current to the rod-shaped conductors 4 and 5, a pair of leads 8 are connected to the inducing conductor 5 and the strap conductor 7, respectively, and to a source of high frequency alternating current 9, for example, a motor-driven, high frequency alternator.

As a result of the heavy currents employed in induction heating, there is a danger of over-heating the current conductors in the circuit. Overheating of the various conductors, previously described, may be prevented by forming the conductors of hollow tubing and passing a cooling medium therethrough in a conventional manner.

As indicated by the arrows in Figure 1, the pipe blank 1 is moved by a suitable conveyor means, not shown in the drawing, through the encircling straps 6 and 7 with the spaced, longitudinal edges 2 and 3 passing beneath the rod-like conductors 4 and 5, respectively.

To provide the required spacing of the longitudinal edges as they travel through the induction circuit, a stationary spacer 10 is supported rearwardly of the strap 7 and between the cold edges of the blank 1. Due to the proximity effects desired, as more fully described hereinafter, the spacer 10 is made as narrow as possible without allowing the edges to touch while being heated.

After passing through the inducing circuit, the heated edges 2 and 3 are forced together by a pair of pressure rolls 11, journaled forwardly of the conductors 4 and 5, such that the finished weld 12 is made somewhat forwardly of the first contact or apex 13 of the edges.

As the blank passes through the welding apparatus, there is a certain amount of of variation in the location of the apex 13. This arises because of differences in blank stiffness and edge smoothness. Therefore, the press rolls 11 and the inducing circuit are spaced so that the tube blank 1 has passed through the inducing circuit before the creating of the apex 13. That is, the apex 13 is forward of the leading strap 6 and never jumps back sufficiently far to cause induced current flow therearound. As noted previously, this also prevents arcing across the edges rearwardly of the apex.

The operation of the invention illustrated in the drawing, and previously described is as set forth hereinafter.

As the pipe blank 1 passes through the induction circuit, the high frequency inducing current flowing, for example as shown by arrows in Fig. 1, in the induction circuit creates an induced current in the blank 1, as shown in Fig. 3. The induced current in the edges 2 and 3 heats the edges to welding temperature. Thereafter, the blank 1 passes between the pressure rolls 11 which force the edges together to form the finished weld 12.

The induced high frequency currents tend to flow as close as possible to an adjacent, oppositely directed current because of proximity effect, as previously noted. Therefore, the induced current which flows in a direction opposite that of the inducing current tends to closely follow the path of the inducing current. The path of the inducing current is so designed that the induced currents do not flow about the apex 13 or arc across the edges. Referring to Fig. 3 in the drawing, the path of induced current is generally saddle-shaped with the current path or pattern following longitudinally along the edges 2 and 3 and circumferentially around the blank 1 lying under the straps 6 and 7.

The induced current flowing between the longitudinal conductors 4 and 5 is distributed throughout the pipe periphery lying beneath the straps 6 and 7. Consequently, the current density is low and the heating of the pipe blank 1 under the strap conductors is low. This is true even though the pipe is subjected to a heating current for a longer period than if a concentrated connecting conductor were employed. For, although heating of the pipe blank is directly proportional to the time of the induced current flow, the heating is also proportional to the square of the current flow and therefore, the value of the current is the dominating factor in the heating.

Due to the generally rod shape of the longitudinal conductors 4 and 5, the induced current is concentrated along the edges 2 and 3 of the pipe blank. Therefore, the edges 2 and 3 are quickly raised to a welding temperature.

The induced current flowing in the longitudinal edge 2 is diametrically opposite in direction to that in the longitudinal edge 3. Therefore, the proximity effect, accompanying high frequency currents, causes high concentration of the currents along the edges 2 and 3. This results in a further increase in the heating of the edges to a welding temperature.

Although the invention is illustrated in Figs. 1, 2 and 3 as employing a single induction coil having opposed sides joined by spaced end straps, other coil configurations which prevent the flow of the induced current around the apex by the use of the proximity effect accompanying high frequency currents are within the scope of this invention. For example, a separate coil for each edge or a coil configuration, as illustrated in Figs. 4 and 5 and now to be described, is within the scope of the present invention.

Referring to Figs. 4 and 5, a pair of spaced edges 14 and 15 of a tube blank 16 are to be welded together. To induce a high frequency current in the edges, there is disposed immediately adjacent each edge 14 and edge 15, in radially spaced relation thereto, a thin, rod-shaped conductor 17 and 18, respectively.

The tube blank 16 is moved by suitable conveyor means, not shown, beneath the induction rods 17 and 18.

After passing beneath the induction coil the heated edges are forced together by a pair of pressure rolls 19 which are journaled forwardly of the conductor such that the finished weld is made somewhat forwardly of the apex 20.

The rod-shaped conductors 17 and 18 are joined at their rearward ends by a strap 21 which extends across the opposed edges 14 and 15 of the blank. The forward ends of the conductors are each connected, somewhat rearwardly of the apex 20, to L-shaped straps 22 and 23 which terminate adjacent the rearward strap connection.

The terminal ends of the L-shaped straps 22 and 23 are gradually enlarged or flared toward the rearward ends of the rod-shaped conductors, as at 24 and 25, respectively, to bias the induced currents in a circuitous circuit into the edges.

The terminal ends of L-shaped straps 22 and 23 are connected by suitable leads to a source of high frequency alternating current 26.

The conductors are hollow and are water cooled to prevent overheating, as previously described with respect to Figs. 1, 2 and 3.

To insure a more perfect weld, a gas shield or envelope is provided about the welding and heating area.

A gas line 27 extends from any suitable gas source, not shown, and terminates in an axial extended line portion 28 lying beneath the heated edges 14 and 15. The extended line portion 28 is sealed at its outer end and is provided with a series of apertures 29 in its upper surface such that the gas flowing therefrom is allowed to rise upwardly through the spaced edges. A cap or cover 30 is disposed above the heating area and the gas accumulates therein to maintain the gas envelope about the edges being heated.

As shown in Fig. 4, the cover 30 extends from in back of the heating inductors 17 and 18 to forwardly of the welding apex 20 and thereby prevents oxidation of the metal within the weld by maintenance of a gaseous atmosphere about the heated edges until they are welded together. Immediately adjacent the weld, a recess 31 in the forward wall 32 of the cover allows the free passage of the heated edges in spaced relation to the forward wall.

The gas line 28 lying beneath the edges 14 and 15 is illustrated as terminating somewhat rearwardly of the apex 20 for purposes of clarity. It may, and generally does, extend at least to the apex 20 to insure exclusion of air and the like until the edges are welded together.

The gas is any substantially non-oxidizing gas which will exclude oxygen from the weld area and thereby prevent the formation of oxide films and inclusions. Argon and helium are common non-oxidizing atmospheres presently employed in arc welding and would provide satisfactory results as would a combination of carbon monoxide and carbon dioxide. Although carbon dioxide, alone, is somewhat oxidizing for purposes of this disclosure it will also provide a satisfactory gaseous shield under controlled service conditions.

The operation of the invention illustrated in Figs. 4, 5 and 6 is described as follows:

As the edges 14 and 15 of tube blank 16 pass beneath the inducing rod-shaped conductors 17 and 18, respectively, a high frequency current is induced in the edges lying immediately below the respective conductors. The induced currents are in a direction opposite from that of the inducing currents and therefore tend to concentrate in a path beneath the conductors 17 and 18. As the conductors adjacent the edges are comparatively concentrated, the induced currents are likewise concentrated along the edges. Because the rod-shaped conductors are connected at adjacent ends in series to the source 26, the current flow therein is in the opposite direction in each conductor which results in opposed flow of induced currents. Due to the proximity effect, previously mentioned, the induced currents are further concentrated in each edge portion, as more clearly seen in Fig. 6.

The positioning of the L-shaped strap conductors provides a circuitous path adjacent each edge rearwardly of the apex 20. The induced currents tend to follow the configuration of the conductors carrying the inducing currents because of the proximity effect.

The present invention provides a method and apparatus for induction welding with a rapid, uniform heating confined to the edges to be welded and with a consequent high quality weld.

Various embodiments of the invention may be employed within the scope of the following claims.

I claim:

1. In a method of welding adjacent metallic edges, the steps of arranging the edges in opposed relation with a gap therebetween, converging the edges into welding engagement at an apex, inducing an electric current directly in each of the opposed edges with the induced current in each edge flowing in an opposite direction to the direction of flow in the opposed edge, and biasing the induced current in each edge in a return circuit away from the apex through proximity affect with the inducing current to substantially eliminate the flow of induced currents around the apex.

2. A method of butt seam welding adjacent metallic edges, which comprises the steps of arranging the edges in opposed relation with a slight gap therebetween, converging the edges into welding engagement at an apex, progressively inducing a concentrated high frequency current directly in one of the opposed edges at a position disposed rearwardly of the apex with the current flowing longitudinally of the edge, simultaneously inducing a concentrated high frequency current directly in the opposed edge at a position disposed rearwardly of the apex with the current flowing longitudinally of the opposed edge and in an opposite direction to the first named current flow, and biasing the induced currents in each edge in a dispersed return circuit removed from the apex to substantially eliminate current flow around the apex.

3. In induction heating apparatus for welding adjacent metallic edges of a workpiece, means to arrange edges in slightly spaced relation, a first elongated conductor longitudinally aligned in spaced relation to a first of the adjacent edges, a second elongated conductor longitudinally aligned in spaced relation to a second of the adjacent edges, means to move the spaced edges relative to the conductor and into welding engagement at an apex spaced to one side of the elongated conductors, conducting means connecting said elongated conductors to a source of current to inductively set up an opposed induced current flow in the metal edges beneath the elongated conductors, and said conducting means including electric conducting means inductively coupled with the workpiece to bias the induced current flow in a return circuit removed from the apex.

4. In apparatus for butt seam welding opposed and spaced longitudinal edges of a workpiece, which comprises a first slender rod-shaped conductor longitudinally aligned and disposed immediately adjacent to a first of the longitudinal edges, a second slender rod-shaped conductor longitudinally aligned and disposed immediately adjacent to a second of the longitudinal edges and circumferentially aligned with respect to said first conductor, means to relatively move the workpiece and the rod-shaped conductors, pressure means disposed in spaced relation to one end of the rod-shaped conductors and adapted to bring the edges into welding engagement at an apex, electric conducting means connecting the rod-shaped conductors in circuit with a source of high frequency current with the current in each of the rod-shaped conductors flowing in a direction opposite to that in the other to induce a longitudinal flowing current in each of the edges, a portion of the conducting means being strap-like conductors connected in series circuit to the rod-shaped conductors and disposed in inductive relation to the workpiece and in spaced relation to the apex to eliminate current flow about the apex.

5. Induction heating apparatus for butt seam welding two adjacent metal edges of a workpiece, which comprises means to arrange the two adjacent metal edges in spaced relation, a first elongated conductor inductively disposed in radial spaced relation to a first of the edges, a second elongated conductor inductively disposed in radial spaced relation to a second of the edges, a source of high frequency alternating current connected in circuit with the elongated conductors to induce opposed currents in the respective edges beneath the conductors and thereby raise the edges to welding temperature, means to effect a relative longitudinal movement of the metal edges and the elongated conductors to progressively bring the edges to welding temperature, means to converge the heated edges into welding engagement at an apex and thereby effect a butt weld of the edges, and means operatively associated with the workpiece to direct the return circuit of the induced currents in a path removed from the converging edges and thereby preventing induced current flow across the converging edges and around the apex.

6. An inductive heating apparatus for butt seam welding the opposed longitudinal edges of a tube blank, which comprises a first elongated conductor disposed immediately adjacent one of the longitudinal edges, a second elongated conductor disposed immediately adjacent the other longitudinal edge, said conductors being longitudinally aligned with the respective edges, a strap conductor encircling the underside of the tube blank and connecting the adjacent ends of the elongated conductors, a second strap conductor encircling the underside of the tube blank in spaced relation to said first strap conductor and having one end connected to said first named longitudinal conductor, and means to connect a source of alternating current between the free end of the second named strap conductor and the second named elongated conductor to provide a current therein and thereby set up an induced current flow in the tube blank, said induced current flow following a path in general conformity with the shape of said elongated conductors and said strap conductors due to the proximity effect accompanying adjacent oppositely flowing alternating currents.

7. An inductive pipe welding apparatus for welding the opposed longitudinal edges of a tube blank, which comprises a pair of spaced generally circular strap conductors adapted to encircle the tube blank, each of said conductors having a discontinuity and having the ends at said discontinuity disposed immediately adjacent the opposed longitudinal edges of said tube blank, a rod-like conductor longitudinally aligned with a first of the longitudinal edges and connected to corresponding ends of the strap conductors, a second rod-like conductor longitudinally aligned with a second of the longitudinal edges and having one end connected to a corresponding end of one of the strap conductors and having the opposite end terminating in spaced relation to the respective end of the other strap conductor, means to connect a source of alternating current to the free end of the last named strap conductor and the second rod-like conductor to provide an oppositely flowing inducing current in the rod-like conductors and thereby set up an oppositely directed induced current in the longitudinal edges, means to relatively move the tube blank and said conductors to progressively heat the longitudinal edges, and pressure means disposed in spaced relation to the rod-like conductors to converge the heated edges into a welding apex in spaced relation to the rod-like conductors.

8. Induction heating apparatus for butt seam welding adjacent metal edges, which comprises a first slender elongated conductor longitudinally aligned and disposed immediately adjacent to one of the metal edges, a second slender elongated conductor longitudinally aligned and disposed immediately adjacent to the other of the metal edges, a strap-like conductor bridging the edges and connecting adjacent ends of the elongated conductors, a pair of generally L-shaped conductors each having one leg connected to the free end of an elongated conductor and extending laterally away from the corresponding edge and having the other leg thereof disposed in generally parallel and laterally spaced relation to the corresponding elongated conductor, said last named leg of each L-shaped conductor terminating adjacent the first named end of the corresponding elongated conductor, a high frequency alternating current source connected to the free ends of the last named legs of the L-shaped conductors to induce into each of said edges a separate set of circulating currents and consequently heat said edges to a welding temperature, and pressure means disposed forwardly of the elongated conductors and adapted to converge the heated metal edges into welding engagement with an apex forwardly of the elongated conductors.

9. Induction heating apparatus according to claim 8 having said L-shaped conductors generally in the form of a strap, said construction distributing the return circut of the nduced current throughout a large area of the pipe blank to reduce the heating of the pipe blank lying under the L-shaped conductors.

10. Induction heating apparatus according to claim 8 having the free end of the second named leg of each L-shaped conductor enlarged and flared toward the corresponding elongated conductor to bias the induced current back into the edge.

11. Induction heating apparatus for butt seam welding two adjacent metal edges, which comprises means to arrange the edges in spaced relation, a pair of slender conductors longitudinally disposed one to each of the edges, electrical conducting means connecting said slender conductors in circuit with a source of high frequency current to induce oppositely flowing current in the respective edges, said conductor means including strap-like conductors connected to the slender conductors and disposed in inductive relation to the metal adjacent the edges to direct the return path of the induced current away from the edges which have passed the slender conductors, means to converge the heated edges into welding engagement after the heated edges have passed the slender conductors, and means to maintain a non-oxidizing gaseous shield about the heated edges until the welding together is completed.

12. Induction heating apparatus according to claim 11 wherein said last named means includes a gas line longitudinally disposed beneath the heated edges and having outlets in the upper surface to allow the gas to escape upwardly about the adjacent edges, and a cover over the heated edges in which the upwardly rising gas accumulates to maintain a gaseous atmosphere about the heated edges and thereby prevent oxidization of the weld metal.

References Cited in the file of this patent

UNITED STATES PATENTS

| | | |
|---|---|---|
| 1,915,082 | Blakeslee | June 20, 1933 |
| 2,480,299 | Klinke | Aug. 30, 1949 |
| 2,496,188 | Wiese | Jan. 31, 1950 |
| 2,692,322 | Bennett | Oct. 19, 1954 |
| 2,762,892 | Park | Sept. 11, 1956 |
| 2,794,108 | Park | May 28, 1957 |

FOREIGN PATENTS

| | | |
|---|---|---|
| 297,490 | Switzerland | Mar. 31, 1954 |